US012701425B2

(12) United States Patent
Selvaganapathy et al.

(10) Patent No.: US 12,701,425 B2
(45) Date of Patent: Aug. 4, 2026

(54) MULTI-SIM OPERATIONS AND DYNAMIC SPECTRUM SHARING

(71) Applicant: Nokia Technologies OY, Espoo (FI)

(72) Inventors: Srinivasan Selvaganapathy, Bangalore (IN); Faranaz Sabouri-Sichani, Aalborg (DK)

(73) Assignee: Nokia Technologies OY, Espoo (FI)

( * ) Notice: Subject to any disclaimer, the term of this patent is extended or adjusted under 35 U.S.C. 154(b) by 505 days.

(21) Appl. No.: 18/246,950

(22) PCT Filed: Sep. 7, 2021

(86) PCT No.: PCT/EP2021/074532
§ 371 (c)(1),
(2) Date: Mar. 28, 2023

(87) PCT Pub. No.: WO2022/069160
PCT Pub. Date: Apr. 7, 2022

(65) Prior Publication Data
US 2023/0370856 A1 Nov. 16, 2023

(30) Foreign Application Priority Data
Sep. 30, 2020 (IN) .............................. 202041042496

(51) Int. Cl.
*H04W 16/14* (2009.01)
*H04W 88/06* (2009.01)

(52) U.S. Cl.
CPC ............ *H04W 16/14* (2013.01); *H04W 88/06* (2013.01)

(58) Field of Classification Search
CPC .............................. H04W 88/06; H04W 16/14
See application file for complete search history.

(56) References Cited

U.S. PATENT DOCUMENTS

| | | | |
|---|---|---|---|
| 11,109,382 B2 * | 8/2021 | Bassirat | ................ H04L 5/0053 |
| 2013/0303203 A1 | 11/2013 | Wang et al. | |
| 2014/0274047 A1 | 9/2014 | Dhanda et al. | |
| 2015/0373667 A1 | 12/2015 | Rajurkar et al. | |

(Continued)

OTHER PUBLICATIONS

Intel Corporation, Solution analysis for R17 Multi-SIM KI#2 and KI#3, Aug. 17-28, 2020, 3GPP TSG-RAN WG2 Meeting #111-e Electronic Meeting, R2-2007961, 7pages.*

(Continued)

*Primary Examiner* — Dai Phuong
(74) *Attorney, Agent, or Firm* — Barta Jones, PLLC

(57) ABSTRACT

A method comprising detecting that a terminal device is associated with a first network subscription and a second network subscription, wherein the first network subscription corresponds to a first radio access technology type and the second network subscription corresponds to a second radio access technology type, and dynamic spectrum sharing is utilized for both network types. The method further comprises determining that the first and second network subscriptions utilize, at least partly, the same connectivity resources of the terminal device, identifying that a reception activity for the first subscription occurs, at least partly, simultaneously with a reception activity for the second subscription, and based at least in part on this identification, transmitting an indication to an access node indicating a need for reduced search space operation.

7 Claims, 7 Drawing Sheets

(56) References Cited

U.S. PATENT DOCUMENTS

| | | | |
|---|---|---|---|
| 2016/0302114 A1 | 10/2016 | Jain et al. | |
| 2018/0368099 A1 | 12/2018 | Chen et al. | |
| 2021/0345342 A1* | 11/2021 | Sakhnini | H04W 72/23 |
| 2022/0272508 A1* | 8/2022 | Alasti | H04W 4/40 |
| 2025/0142509 A1* | 5/2025 | Zaus | H04L 65/1016 |

OTHER PUBLICATIONS

Jakob L. Buthler et al., "Dynamic Multi-SIM Gay Creating Procedure," Department of Electronic Systems, Aalborg University, IEEE, 2016, pp. 1-5.

Lalit Pathak et al., "Efficient Protocol for Performance Enhancement of B4G and 5G Networks for MultiSIM Deployment," 16th IEEE Annual Consumer Communications & Networking Conference (CCNC), 2019, pp. 1-7.

Wikipedia IEEE 802.11, https://en.wikipedia.org/wiki/IEEE_802.11, retrieved Apr. 7, 2023.

Msc-Generator, Draws signalling charts, block diagrams and graphs from text input, https://gitlab.com/msc-generator/msc-generator, retrieved Apr. 28, 2022.

"Support for Multi-SIM devices in Rel-17," 3GPP TSG RAN Meeting #86, RP-193263, Sitges, Spain, Dec. 9-12, 2019.

Revised SID: Study on System Enablers for Multi-SIM Devices, TSA SA Meeting #SP-83, SP-190248, Shenzhen, China, Mar. 20-22, 2019.

"Discussion on Paging CORESET Design for NR," 3GPP TSG RAN WG1 Meeting AH 1801, R1-1800540, Vancouver, Canada, Jan. 22-26, 2018.

"Discussion on SA2/RAN Work Split for Key Issue#2 and Related TP," SA WG2 Meeting #136AH, S2-2000133, Incheon, Korea, Jan. 13-17, 2020.

"Handling of Paging Collision for Multi-SIM," 3GPP TSG-RAN WG2 Meeting #111-e, R2-2006944, Aug. 17-28, 2020.

International Search Report and Written Opinion received for corresponding Patent Cooperation Treaty Application No. PCT/EP2021/074532, dated Dec. 10, 2021, 13 pages.

"Solution analysis for R17 Multi-SIM KI#2 and KI#3", 3GPP TSG-RAN WG2 Meeting #111-e, R2-2007961, Agenda: 8.3, Intel Corporation, Aug. 17-28, 2020, 7 pages.

Office action received for corresponding European Patent Application No. 21773352.6, dated Mar. 22, 2024, 5 pages.

Notice of Allowance received for corresponding European Patent Application No. 21773352.6, dated May 20, 2025, 7 pages.

* cited by examiner

700

MULTI-SIM OPERATIONS AND DYNAMIC SPECTRUM SHARING

CROSS-REFERENCE TO RELATED APPLICATIONS

This application is a national phase under 35 U.S.C. § 371 of PCT International Application No. PCT/EP2021/074532 which has an International filing date of Sep. 7, 2021, which claims priority to Indian Application No. 202041042496, filed Sep. 30, 2020, the entire contents of each of which are hereby incorporated by reference.

FIELD

The following exemplary embodiments relate to operations performed in dynamic spectrum sharing deployments.

BACKGROUND

A terminal device may be able to operate using multiple simultaneous network subscriptions. In such a use case, the hardware resources of the terminal device may be shared with the multiple simultaneous network subscriptions. Therefore, it is beneficial to optimize the hardware resource usage between the multiple simultaneous network subscriptions that may also occur in a dynamic spectrum sharing deployment.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising at least one processor, and at least one memory including a computer program code, wherein the at least one memory and the computer program code are configured, with the at least one processor, to cause the apparatus to: detect that a first network subscription and a second network subscription are associated with a terminal device, wherein the first network subscription is to a first radio access technology type and the second network subscription is to a second radio access technology type, and dynamic spectrum sharing is utilized for the first network type and the second network type, determine that the first network subscription and the second network subscription utilize, at least partly, same connectivity resources comprised in the terminal device, identify that an occurrence of a first reception activity regarding the first network subscription occurs, at least partly, simultaneously with a second reception activity regarding the second network subscription; and based, at least partly, on the identifying, transmit a first indication indicating a need for reduced search space operation to an access node.

In an exemplary embodiment according to the first aspect, in the reduced search space operation, the terminal device monitors orthogonal frequency-division multiplexing symbols of control resource set for paging monitoring in a limited manner.

In an exemplary embodiment according to the first aspect, the first indication is transmitted by the terminal device using radio resource control signalling.

In an exemplary embodiment according to the first aspect, the apparatus is further caused to receive from the access node radio resource signalling that configures the terminal device for the reduced search space operation.

In an exemplary embodiment according to the first aspect, the apparatus is further caused to determine a need for a switching gap.

In an exemplary embodiment according to the first aspect, the need for the switching gap is indicated using a second indication to the access node.

In an exemplary embodiment according to the first aspect, detecting that dynamic spectrum sharing is utilized is based on internal signalling within the terminal device, wherein the internal signalling comprises exchanging information regarding network configurations of the first and the second network configurations respectively.

In an exemplary embodiment according to the first aspect, the first radio access technology type is 5G, associated with the access node and the second radio access technology type is a 4G associated with a second access node, and the access node is a gNB and the second access node is an eNB.

In an exemplary embodiment according to the first aspect, the first reception activity comprises a system information block reception or a paging occasion, and the second reception activity comprises a system information block reception or paging monitoring.

In an exemplary embodiment according to the first aspect, the apparatus is further caused to transmit a third indication to the access node, the third indication indicating a restriction on bandwidth part operation that limits a bandwidth part to a bandwidth and a subcarrier spacing associated with the network supporting the least bandwidth part.

According to a second aspect there is provided an apparatus comprising at least one processor, and at least one memory including a computer program code, wherein the at least one memory and the computer program code are configured, with the at least one processor, to cause the apparatus to, receive a first indication indicating a need for a reduced search space operation from a terminal device, and indicate the need for reduced search space operation to an access and mobility management function.

In an exemplary embodiment according to the second aspect, the apparatus is further caused to transmit a connection release signalling to the terminal device, wherein the connection release signalling configures the terminal device for the reduced search space operation.

In an exemplary embodiment according to the second aspect, the apparatus is further caused to receive a second indication indicating a need for a switching gap and configuring the switching gap.

In an exemplary embodiment according to the second aspect, configuring the switching gap further comprises transmitting radio resource control message to configure the switching gap for connected mode operations in control channel and in data channel reception and/or transmission In an exemplary embodiment according to the second aspect, the apparatus is comprised in a gNB.

According to a third aspect there is provided an apparatus comprising means for detecting that a first network subscription and a second network subscription are associated with a terminal device, wherein the first network subscription is to a first radio access technology type and the second network subscription is to a second radio access technology type, and dynamic spectrum sharing is utilized for the first network type and the second network type, determining that the first network subscription and the second network subscription utilize, at least partly, same connectivity resources comprised in the terminal device, identifying that an occurrence of a first reception activity regarding the first network subscription occurs, at least partly, simultaneously with a second reception activity regarding the second network subscription, and based, at least partly, on the identifying, transmitting a first indication indicating a need for reduced search space operation to an access node.

According to a fourth aspect there is provided an apparatus comprising means for receiving a first indication indicating a need for a reduced search space operation from a terminal device, and indicating the need for reduced search space operation to an access and mobility management function.

According to a fifth aspect there is provided a method comprising detecting that a first network subscription and a second network subscription are associated with a terminal device, wherein the first network subscription is to a first radio access technology type and the second network subscription is to a second radio access technology type, and dynamic spectrum sharing is utilized for the first network type and the second network type, determining that the first network subscription and the second network subscription utilize, at least partly, same connectivity resources comprised in the terminal device, identifying that an occurrence of a first reception activity regarding the first network subscription occurs, at least partly, simultaneously with a second reception activity regarding the second network subscription, and based, at least partly, on the identifying, transmitting a first indication indicating a need for reduced search space operation to an access node.

According to a sixth aspect there is provided a method comprising receiving a first indication indicating a need for a reduced search space operation from a terminal device, and indicating the need for reduced search space operation to an access and mobility management function.

According to a seventh aspect there is provided a computer program product readable by a computer and, when executed by the computer, configured to cause the computer to execute a computer process comprising detecting that a first network subscription and a second network subscription are associated with a terminal device, wherein the first network subscription is to a first radio access technology type and the second network subscription is to a second radio access technology type, and dynamic spectrum sharing is utilized for the first network type and the second network type, determining that the first network subscription and the second network subscription utilize, at least partly, same connectivity resources comprised in the terminal device, identifying that an occurrence of a first reception activity regarding the first network subscription occurs, at least partly, simultaneously with a second reception activity regarding the second network subscription, and based, at least partly, on the identifying, transmitting a first indication indicating a need for reduced search space operation to an access node.

According to an eighth aspect there is provided a computer program product readable by a computer and, when executed by the computer, configured to cause the computer to execute a computer process comprising receiving a first indication indicating a need for a reduced search space operation from a terminal device, and indicating the need for reduced search space operation to an access and mobility management function.

According to a ninth aspect there is provided a computer program product comprising computer-readable medium bearing computer program code embodied therein for use with a computer, the computer program code comprising code for performing detecting that a first network subscription and a second network subscription are associated with a terminal device, wherein the first network subscription is to a first radio access technology type and the second network subscription is to a second radio access technology type, and dynamic spectrum sharing is utilized for the first network type and the second network type, determining that the first network subscription and the second network subscription utilize, at least partly, same connectivity resources comprised in the terminal device, identifying that an occurrence of a first reception activity regarding the first network subscription occurs, at least partly, simultaneously with a second reception activity regarding the second network subscription, and based, at least partly, on the identifying, transmitting a first indication indicating a need for reduced search space operation to an access node.

According to a tenth aspect there is provided a computer program product comprising computer-readable medium bearing computer program code embodied therein for use with a computer, the computer program code comprising code for performing receiving a first indication indicating a need for a reduced search space operation from a terminal device, and indicating the need for reduced search space operation to an access and mobility management function.

According to an eleventh aspect there is provided a computer program comprising instructions for causing an apparatus to perform at least the following: detect that a first network subscription and a second network subscription are associated with a terminal device, wherein the first network subscription is to a first radio access technology type and the second network subscription is to a second radio access technology type, and dynamic spectrum sharing is utilized for the first network type and the second network type, determine that the first network subscription and the second network subscription utilize, at least partly, same connectivity resources comprised in the terminal device, identify that an occurrence of a first reception activity regarding the first network subscription occurs, at least partly, simultaneously with a second reception activity regarding the second network subscription; and based, at least partly, on the identifying, transmit a first indication indicating a need for reduced search space operation to an access node.

According to a twelfth aspect there is provided a computer program comprising instructions for causing an apparatus to perform at least the following: receive a first indication indicating a need for a reduced search space operation from a terminal device, and indicate the need for reduced search space operation to an access and mobility management function.

According to a thirteenth aspect there is provided a computer readable medium comprising program instructions for causing an apparatus to perform at least the following: detect that a first network subscription and a second network subscription are associated with a terminal device, wherein the first network subscription is to a first radio access technology type and the second network subscription is to a second radio access technology type, and dynamic spectrum sharing is utilized for the first network type and the second network type, determine that the first network subscription and the second network subscription utilize, at least partly, same connectivity resources comprised in the terminal device, identify that an occurrence of a first reception activity regarding the first network subscription occurs, at least partly, simultaneously with a second reception activity regarding the second network subscription; and based, at least partly, on the identifying, transmit a first indication indicating a need for reduced search space operation to an access node.

According to a fourteenth aspect there is provided a computer readable medium comprising program instructions for causing an apparatus to perform at least the following: receive a first indication indicating a need for a reduced search space operation from a terminal device, and indicate the need for reduced search space operation to an access and mobility management function.

According to a fifteenth aspect there is provided a non-transitory computer readable medium comprising program instructions for causing an apparatus to perform at least the following: detect that a first network subscription and a second network subscription are associated with a terminal device, wherein the first network subscription is to a first radio access technology type and the second network subscription is to a second radio access technology type, and dynamic spectrum sharing is utilized for the first network type and the second network type, determine that the first network subscription and the second network subscription utilize, at least partly, same connectivity resources comprised in the terminal device, identify that an occurrence of a first reception activity regarding the first network subscription occurs, at least partly, simultaneously with a second reception activity regarding the second network subscription; and based, at least partly, on the identifying, transmit a first indication indicating a need for reduced search space operation to an access node.

According to a sixteenth aspect there is provided a non-transitory computer readable medium comprising program instructions for causing an apparatus to perform at least the following: receive a first indication indicating a need for a reduced search space operation from a terminal device, and indicate the need for reduced search space operation to an access and mobility management function.

LIST OF DRAWINGS

In the following, the invention will be described in greater detail with reference to the embodiments and the accompanying drawings, in which FIG. 1 illustrates an exemplary embodiment of a radio access network.

DESCRIPTION OF EMBODIMENTS

Figure 1:
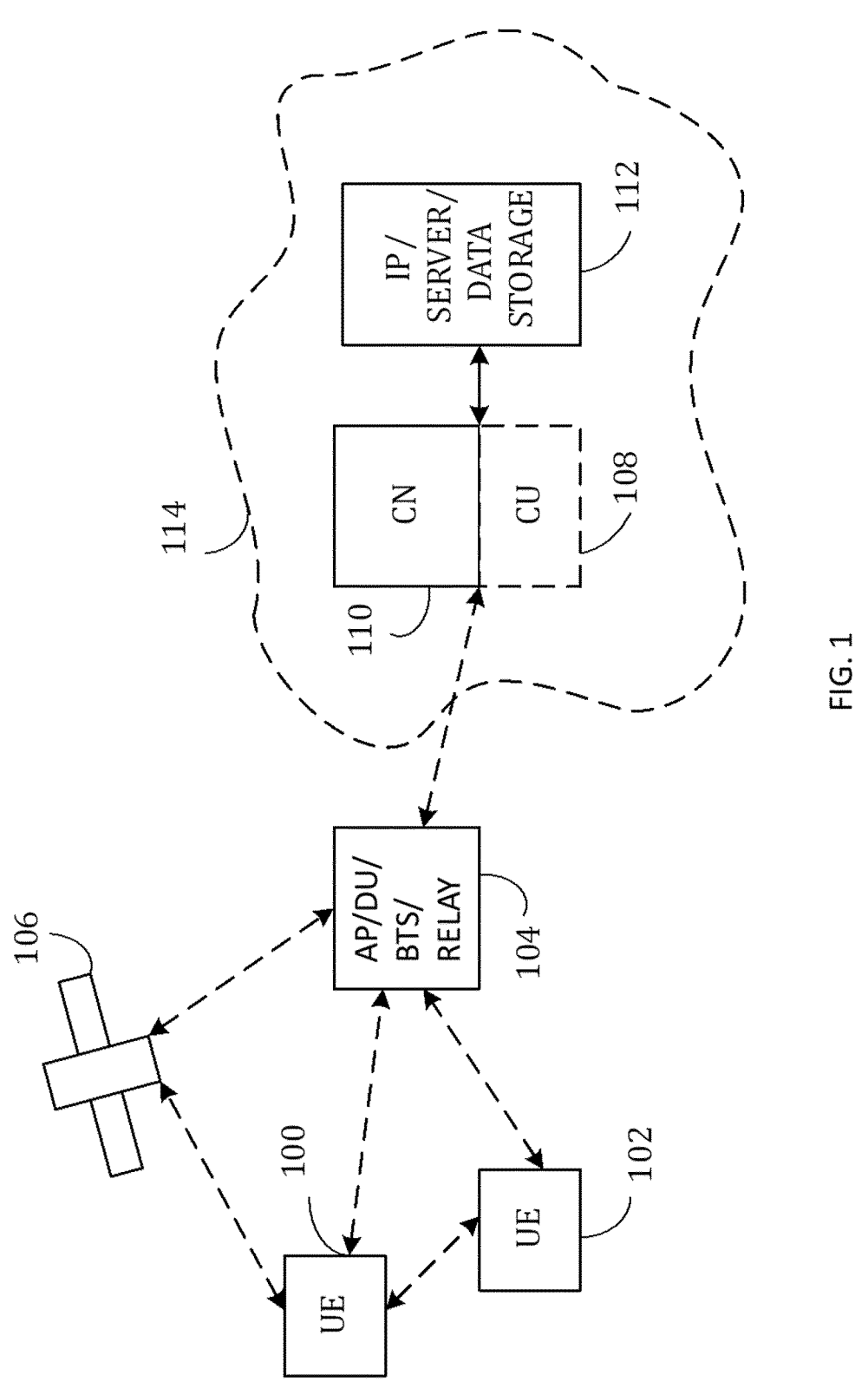

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, which may be also be called as a wireless network, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network (RAN).

FIG. 1 shows terminal devices 100 and 102 configured to be in a wireless connection on one or more communication channels in a cell with an access node (such as (e/g)NodeB) 104 providing the cell. The access node 104 may also be referred to as a node. The physical link from a terminal device to a (e/g)NodeB is called uplink or reverse link and the physical link from the (e/g)NodeB to the terminal device is called downlink or forward link. It should be appreciated that (e/g)NodeBs or their functionalities may be implemented by using any node, host, server or access point etc. entity suitable for such a usage. For example, a gNB may be decomposed such that it is split to a centralized unit (CU) that may be connected to one or more remotely located distributed units (DUs), and there may be an F1 interface between a DU and the CU. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or an interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices.

The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW), for providing connectivity of terminal devices (UEs) to external packet data networks, or mobile management entity (MME), components comprised in 5G core, such as user plane function (UPF) core access and mobility management function (AMF) and session management function (SMF) etc.

The terminal device, which may also be called as UE, user equipment, user terminal, user device, etc. illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a DU part. A CU may coordinate the DU operation via F1AP interface for example.

The terminal device may refer to a portable computing device that includes wireless mobile communication devices operating with or without a subscriber identification module (SIM), or an embedded SIM (eSIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise the cloud for example for storing data and/or accessing data. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) which may be understood as a system of collaborating computational elements controlling physical entities. CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the application close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). It is to be noted that in some examples also the AP/DU element 104 may utilize cloud services. The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN) or any other non-ETSI virtualization infrastructure. Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at the RAN side (in a distributed unit, DU 104) and non-real time functions being carried out in a centralized manner (in a centralized unit, CU 108).

It should also be understood that the functional distribution between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases comprise providing service continuity for machine-to-machine (M2M) or Internet of Things (IoT) devices or for passengers on board of vehicles, and/or ensuring service availability for critical communications, and/or future railway/maritime/aeronautical communications. Satellite communication may utilise geostationary earth orbit (GEO) satellite systems, but also low earth orbit (LEO) satellite systems, for example, mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized. HAPS may be understood as radio stations located on an object at an altitude of 20-50 kilometres and at a fixed point relative to the Earth. For example, broadband access may be delivered via HAPS using lightweight, solar-powered aircraft and airships at an altitude of 20-25 kilometres operating continually for several months for example.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

As 5G networks become more widely used, the co-existence of 4G and 5G becomes an important aspect. Dynamic spectrum sharing, DSS, addresses this issue by allowing deployment of both 4G and 5G in the same frequency band. In DSS, frequency spectrum resources between 4G and 5G may be dynamically allocated based on user demand. For example, if an operator has a spectrum, without DSS, the spectrum may have to be allocated between 4G and 5G in a static manner. In other words, the spectrum needs to be split. This may lead to a situation in which there may be far more terminal devices in one split to be served than in the other split. This may lead to spectrum utilization that is not optimal. With DSS, such split is not needed. With DSS, it may be dynamically determined how much spectrum is required by 4G users and how much is required by 5G users. This may be done for example every millisecond.

Figure 2:
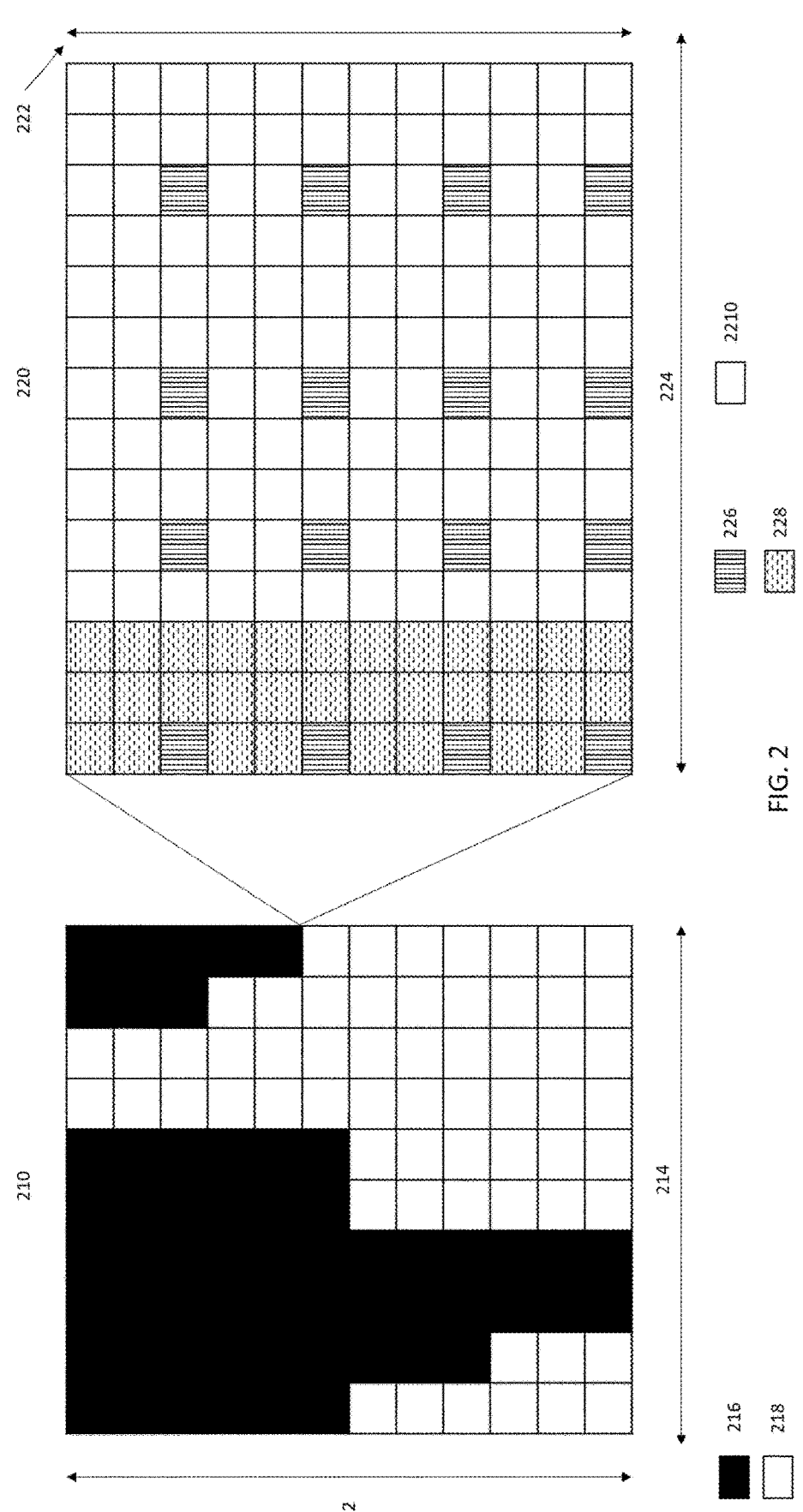
FIG. 2 illustrates an exemplary embodiment of dynamic spectrum sharing.

FIG. 2 illustrates an exemplary embodiment of DSS. In DSS, terminal devices that use different radio access technologies (RATs), for example terminal devices that use 4G and terminal devices that use 5G, may work seamlessly on same absolute radio-frequency channel number (ARFCN), which is a code used for specifying a pair of physical radio carriers such that one carrier is for the uplink signal and one carrier for the downlink signal. Thus, DSS enables an operator to flexibly reform existing 4G spectrum as needed. The spectrum sharing may be on time domain resources and frequency domain resources within the operating bandwidth. In FIG. 2, there is an illustration of time and frequency domain allocation 210. In this exemplary embodiment, the time window 214 is 100 ms, yet in some other exemplary embodiments the time window could be something else. The frequency spectrum 212 in this exemplary embodiment is 20 MHz, although in some other exemplary embodiments it may be something else. Allocation 216 illustrates 4G data and allocation 218 illustrates 5G data. As is illustrated, allocations 216 and 218 are both in time and in frequency domain.

In FIG. 2, there is also illustrated an exemplary embodiment of a resource block structure 220 in DSS. The subframe 224 of the time window 214 is in this exemplary embodiment 1 ms, although in some other exemplary embodiments it may something else. The duration of a symbol in this exemplary embodiment is 0.07 ms. The frequency spectrum 222 of the subframe in this exemplary embodiment is 180 kHz. Symbol 226 illustrates 4G data, or 5G data and 5G reference. Symbol 228 illustrates 4G reference and symbol 2210 illustrates 4G or 5G control.

A terminal device may have capability of connecting to a plurality of network subscriptions simultaneously. For example, the terminal device may have simultaneous subscriptions to two or more networks that follow 3GPP or 3GPP2 standards. Such subscriptions may be via international mobile subscriber identities, IMSI for evolve packet system, EPS. IMSI is a unique ID that globally identifies a mobile subscriber and the IMSI may be comprised in a USIM card comprised in a terminal device. At least one other subscription may be via subscription permanent identifier, SUPI, in case of 5G system, 5GS that may also be comprised in USIM card comprised in the terminal device. Each network subscription may be associated with a subscription belonging to the same or different mobile network operator, MNO or, mobile virtual network operator, MVNO. The terminal device may thus be a multi-USIM, MUSIM, device.

Depending on the capabilities of the MUSIM device, it may handle the multiple network subscriptions in various manners. For example, if there are two simultaneous network subscriptions and the terminal device comprises two USIMs, the behaviour of the terminal device with respect to the network subscriptions may depend on connectivity resources, that may be understood to comprise software and/or hardware resources required to connect the terminal device to a network corresponding to a network subscription, comprised in the terminal device. For example, if connectivity resources of the terminal device comprise a single transmitter and a single receiver, then the terminal device may receive traffic from only one network at a time and the terminal device may transmit traffic to only one network at a time as well. On the other hand, if the connectivity resources of the terminal device comprise two receivers and one transmitter, then the terminal device may receive traffic from two networks simultaneously but transmit traffic only to one network at a time. Further, if the connectivity resources of the terminal device comprise two transmitters and two receivers, then the terminal device may receive traffic from two networks simultaneously and also transmit traffic to two networks simultaneously.

Based on the connectivity resources comprised in MUSIM terminal devices, for example two types may be determined for MUSIM terminal devices. One such type may be multi USIM multi standby, MUMS. A terminal device of this type may be registered with two or more independent subscriber IDs corresponding to its USIMs and may be in RRC_IDLE mode on all USIMs. However, it may be on RRC_CONNECTED mode with a single USIM at a given time. Another type may be multi USIM multi active, MUMA. Terminal device of this type may be MUSIM devices which are registered with two or more independent USIMs and may be in RRC_IDLE mode on all USIMs and the device may also maintain RRC_CONNECTED mode activities on all USIMs simultaneously.

In an exemplary embodiment, a terminal device may comprise two USIMs that both are associated with a 4G network subscription. 4G may be understood as a type of RAT. In such an exemplary embodiment, both USIMs may operate over 4G radio links towards different public and mobile networks, PLMNs. In an alternative exemplary embodiment, the terminal device may comprise one USIM that has a 5G network subscription associated to it and another USIM that has a 4G network subscription associated to it. 5G may be understood as another type of RAT. In this exemplary embodiment, the terminal device may operate over a 4G radio link and a 5G radio link for each of the USIM operations respectively. The following exemplary embodiments may be utilized by a MUSIM terminal device that is associated with two networks subscriptions such that the first network subscription is to a network using a first RAT type and the second network subscription is associated with another network using a second RAT type and both networks share the same frequency spectrum.

In an exemplary embodiment, a terminal device that is a MUSIM device that comprises an USIM for 4G network subscription and an USIM for 5G network subscription and the 4G and 5G network operate using DSS, operations between the two USIMs may vary depending on the state of the subscriptions. In a state in which the terminal device is in idle mode operation for both USIMs, the terminal device instances of both USIMs are in idle mode and listening to the common channels of serving cells of corresponding PLMN. If the connectivity resources of the terminal device comprise two transmitters and two receivers, this operation may not have an impact on each of the terminal device instance as the terminal device comprises a dedicated receiver for each of the USIM operation. However, if the terminal device comprises a single receiver in the connectivity resources, the reception may have to be multiplexed between two PLMNs. If paging occasions corresponding to each USIM occur at the same time or are overlapping, the terminal device may need to skip listening to paging of from one of the two networks. Such situation may be understood as a paging collision.

In general, if a terminal device such as a MUSIM, is associated with a first network subscription to a first type of radio access technology and with a second network subscription to a second type of radio access technology and the first and the second network utilize DSS, then the connectivity resources of the terminal device may be shared, at least partly, by the first network subscription and the second network subscription. Further, a situation may occur in which a reception activity, such as reception of system information block (SIB) or paging monitoring, regarding the first network subscription is to occur or has occurred, at least partly, simultaneously with a reception activity, such as reception of SIB or paging monitoring regarding the second network subscription. In other words, a simultaneous occurrence is identified. Simultaneous occurrence may be understood such that the connectivity resources are being used by one network subscription at a time when an activity associated with the other network subscription would also require at least some of the connectivity resources being used for successfully performing the activity. Information comprised in SIB may be utilized for example to detect that the first type of radio access technology operates in same frequency spectrum as the second type of radio access technology in a DSS configuration. A paging occasion may be determined based on ID of the terminal device. In an exemplary embodiment, in which 5G is utilized, paging monitoring may be performed based on common control resource set, CORESET. It is to be noted that paging monitoring occurs at a paging occasion.

Another state may be such that the terminal device is in idle mode operation for one USIM and in connected mode operation for the other USIM. In such a state, the terminal device may be in connected mode, RRC_connection, with one of its USIMs and, simultaneously, in RRC_idle or RRC_inactive with the other USIM. If the terminal device comprises one receiver in the connectivity resources, the terminal device may need to interrupt its RRC_connection whenever it needs to listen to the common channels of serving cells of the other USIM that is in RRC_idle or RRC_inactive.

A further state may be such that the terminal device is in connected mode for both USIMs. This state however requires that the terminal device is capable of maintaining two transmissions and receptions simultaneously. This may be the case for example if the connectivity resources of the terminal device comprise two transmitters and two receivers. Yet, the terminal device may also be capable of maintaining two transmissions and receptions simultaneously if the connectivity resources are shared in a manner enabling the maintaining. If the terminal device comprises a single transmitter and two receivers in the connectivity resources, then the terminal device may need to switch between two networks in uplink. This may be based on internal implementation of the terminal device.

For a MUSIM terminal device with 4G and 5G USIMs operating over same carrier frequency and having DSS, paging collision may be optimized without changing paging identifier or paging occasion that requires additional coordination between core networks. Further, a state in which the terminal device is in connected mode for both USIMs may be achieved for terminal device that comprises one transmitter and one receiver in the connectivity resources when DSS is utilized. The single transmitter or receiver may switch between 4G and 5G operation in time-division multiplexing, TDM, manner for MUSIM operation. If the 4G and 5G resources are adjacent, the terminal device may need switching time for changing the base band operation from 4G to 5G and vice versa. The changes needed may be dependent on difference in 5G bandwidth and subcarrier spacing, SCS, and 4G bandwidth and SCS. The changing time may be referred to as a switching gap. The switching gap may be utilized to prevent degradation in the physical uplink shared channel, PUSCH, and/or, physical downlink shared channel, PDSCH, operation on these adjacent resources.

If DSS is utilized to support 4G and 5G on the same PLMN, and the terminal device that is a MUSIM device, may encounter an issue of connectivity resources required by both USIM subscriptions simultaneously while the connectivity resources are to be shared. Thus, it would be beneficial if the terminal device could resolve the issue of simultaneous need of same connectivity resources.

In an exemplary embodiment, the terminal device comprising two USIMs is in a state in which the terminal device is in idle mode operation for both USIMs. A first USIM is configured for 4G operation and a second USIM in this exemplary embodiment is configured for 5G operation. Both USIMs are used to connect to same PLMN over same frequency spectrum. In other words, DSS is utilized. In this exemplary embodiment, the terminal device may provide an indication to an access node regarding a need for a reduced search space operation. The indication may be transmitted to a gNB using a RRC signalling message. The reduced search space operation may be understood such that the terminal device does not have to monitor the first orthogonal frequency-division multiplexing, OFDM, symbol of common control resource set, CORESET, for paging monitoring. In other words, monitoring may be performed in a limited manner. CORESET may be understood as a resource grid on the air interface in which scheduling information for downlink and uplink data is sent from the gNB to terminal devices. CORESET may be used, for example, to describe at which resource block, RB in the frequency domain the control area starts and how many RBs it spans. When the terminal device, using the 5G USIM, in RRC_connected state detects change of globally unique temporary identifier, GUTI, based on non-access stratum, NAS, signalling, it may detect if paging collision occurs based on internal signalling within the terminal device with the 4G USIM. If the collision is detected to occur, the terminal device may transmit an indication using 5G RRC signalling message. The indication may be sent as new RRC message or part of an existing RRC signaling message for example, as part of its next scheduling request. The gNB may then configure the terminal device with the reduced search space as part of connection release towards the terminal device. gNB may also provide information relating to the reduced search space to an access and mobility management function, AMF, that is a function of the 5G core. AMF may then transmit the information in next paging message scheduled to be sent over last connected cell.

In another exemplary embodiment, a terminal device that is a MUSIM terminal device with one 4G USIM and one 5G USIM, is in a state in which the terminal device is in connected mode for both USIMs. In this exemplary embodiment, the terminal device may indicate a need for reduced search space operation for a terminal device specific search space and PDSCH/PUSCH operations via RRC connection to a gNB. The indication may be transmitted by the terminal device whenever the 4G USIM instance is also entering into connected mode operation on the same frequency but with a DSS option. Additionally, the terminal device may indicate, using for example an indication, the need for a switching gap on specific time locations of subframes and symbols. The gNB may then configure a pattern. The pattern may comprise the reduced search space operation and the switching gaps indicated by the terminal device. The pattern may be configured over multiple subframes defined with periodicity.

If, in this exemplary embodiment, the gNB cannot support the reduced PDSCH/PUSCH operation for switching, the terminal device may indicate the restriction on bandwidth part, BWP, operation. This operation may then limit the BWP that comprises BW and SCS. The limitation may be for example such that the BWP is limited to correspond to 4G operation whenever the 4G USIM enters into connected mode. For operations with same SCS and bandwidth, the switching gap may not be required. The BWP restriction may then be released when the 4G USIM enters into idle mode. In this exemplary embodiment the terminal device transmits additional signalling regarding BWP and/or bandwidth restriction using RRC signalling message to the gNB. The RRC signalling message may also be utilized when the terminal device transmits indication regarding reverting back to remove the restrictions.

In general, a terminal device that has simultaneously a 4G network subscription and a 5G network subscription, may indicate a need for reduced PDCCH reception for idle mode monitoring if DSS is utilized and the terminal device identifies a paging collision. Identifying a paging collision may comprise identifying that a paging collision has occurred or identifying that a paging collision occurs or will occur. In other words, it is identified that a paging collision has occurred or that there is a possibility that a paging collision occurs or will occur. A gNB may then schedule Idle mode PDCCH in reduced number of symbols within PDCCH towards the terminal device. Further, the terminal device may provide an indication regarding a need for a switching gap. The PDCCH and PDSCH transmissions towards the terminal device may then be adjusted by configuring the switching gap for PDCCH and PDSCH resources.

Figure 3:
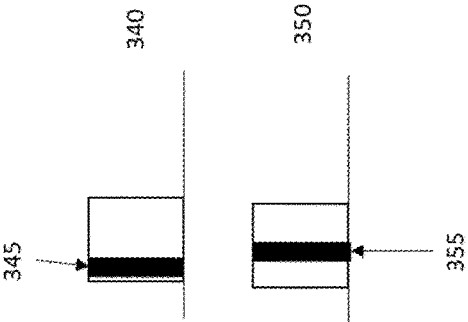
FIG. 3 and FIG. 4 illustrate exemplary embodiments of a terminal device with a plurality of network subscriptions associated with it.
Figure 3:
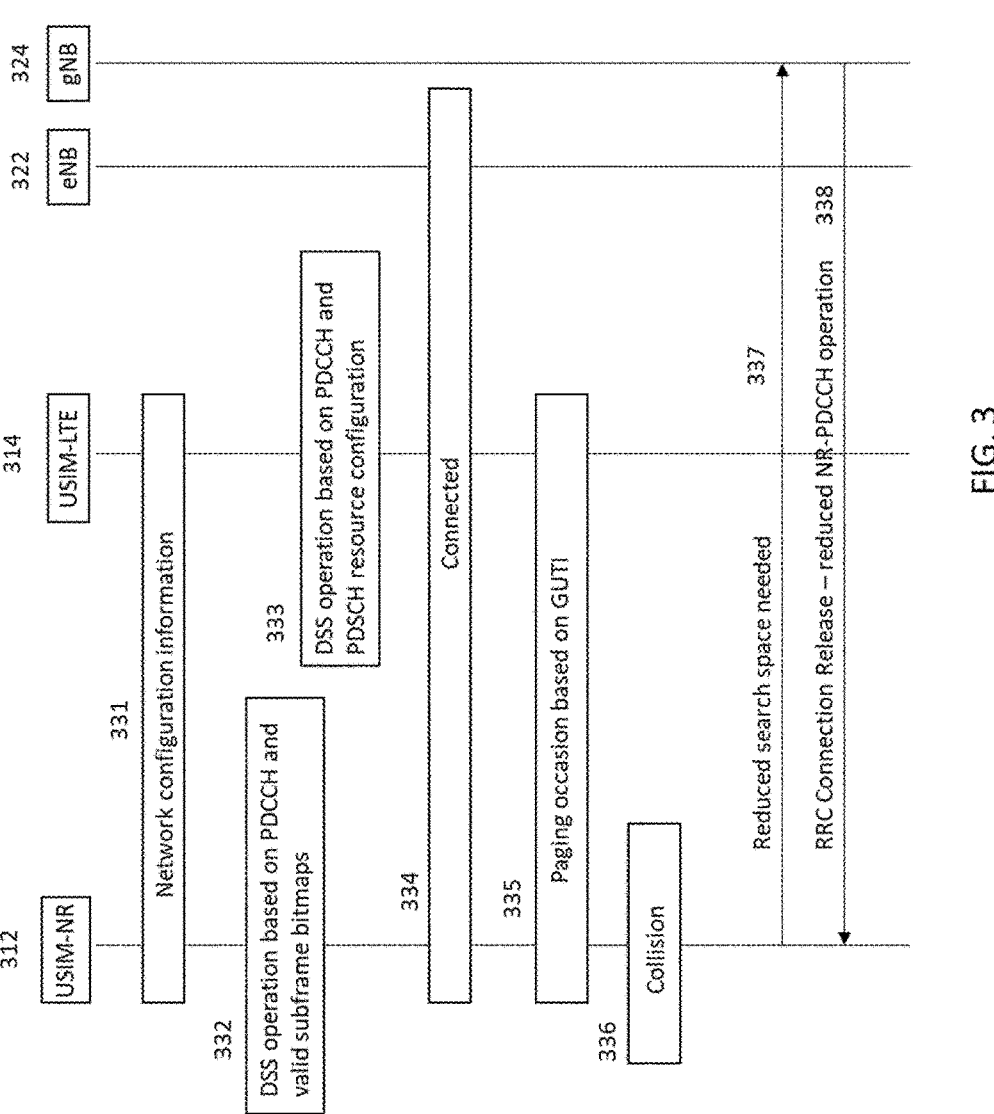

FIG. 3 illustrates an exemplary embodiment in which a terminal device comprises a network subscription to a 4G network and a network subscription to a 5G network. The terminal device further comprises an USIM for the 4G network subscription and an USIM for the 5G network subscription. In this exemplary embodiment, the status of the terminal device regarding the network subscriptions is idle state for both network subscriptions. DSS is utilized for the 4G network and the 5G network. In this exemplary embodiment, the terminal device detects that it is connected to two network subscriptions that are for different networks and that DSS is utilized. In other words, there is a first network subscription and a second network subscription associated with the terminal device. The terminal device comprises a 5G USIM 312, that may also be referred to as a USIM-NR. The terminal device also comprises a 4G USIM 314, that may also be referred to as a USIM-LTE. In this exemplary embodiment, the connectivity resources of the terminal device used for receiving signalling from the network subscription, in other words, the receiver, is to be shared with the other network subscription. Thus, the terminal device may determine that sharing of connectivity resources is required. This determination may be achieved for example by signalling internal to the terminal device. This signalling 331 may occur, at least partly, between the 4G USIM 314 and the 5G USIM 312. The signalling 331 comprises exchanging information regarding network configurations corresponding to the network subscriptions respectively.

In 332 DSS operation for 5G network is detected based on PDCCH configurations and valid subframe bitmap. This may be performed by the 5G USIM 312. In 333 on the other hand, DSS operations are determined for the 4G network based on PDCCH and PDSCH resource configuration. This may be performed by the 4G USIM 314. Then in 334 a connection may be established to a gNB 324. In the connected state, the GUTI value may be detected. Based on the GUTI value, paging occasion may be determined, for example by calculating, by the terminal device for the 4G network and the 5G network in 335. If a paging collision is then identified by the terminal device in 336, then in 337 the terminal device may transmit a request for a reduced CORESET to the gNB 324 and the gNB 324 may then configure the terminal device for a reduced CORESET in using an RRC connection release signalling in 338. It is to be noted that the 4G connection may be provided by the eNB 322.

Additionally, in some exemplary embodiments, 4G PDCCH and 5G CORESET may, in already be scheduled in exclusive OFDM symbols utilizing DSS. However, if the terminal device comprises a transmitter that is to be shared, there may be a need for the switching gap. Thus, some symbols may be needed to avoid missing information during its switching and the terminal device may request for reduced CORESET operation to make room for the switching. This may be done for examples as a part of the request for a reduced CORESET to the gNB 324.

Further additionally, in some exemplary embodiments, if a serving temporary mobile subscriber identity, S-TMSI, is changed through GUTI re-allocation procedure for the 5G USIM 312 terminal device instance, the terminal device may internally identify again if a paging collision may occur. This may be performed using internal signalling between the 5G USIM 312 and the 4G USIM 314. Further, a need for a switching gap may be determined. The determination may be based on internal interaction between the USIMs.

Further additionally, in some exemplary embodiments, RRC signalling procedure may be used for activation of reduced-search-space operation. In this signalling, the terminal device indicates via uplink RRC signalling message to the gNB 324 a need for excluding some initial symbols for PDCCH in idle mode. The gNB 324 then indicates the reduced PDCCH operation in RRC Connection Release message. In idle mode regarding the 5G network subscription, the PDCCH reduced operation then PDCCH monitoring in paging occasion excludes initial symbols of PDCCH to provide extra time, for example 1-2 symbols, at the terminal device for switching the usage of the connectivity resources of the terminal device.

In FIG. 3, an exemplary embodiment of a 5G paging occasion 340 is illustrated. Also, 4G PDCCH symbols 345 are illustrated. 4G paging occasion 350 is also illustrated along with 5G PDCCH symbols 355. In this exemplary embodiment, there is a paging collision between the 5G paging occasion and 4G paging occasion. Because of this the terminal device then transmits a request to limit or shift LTE-PDCCH vs. NR-PDCCH symbols.

Figure 4:
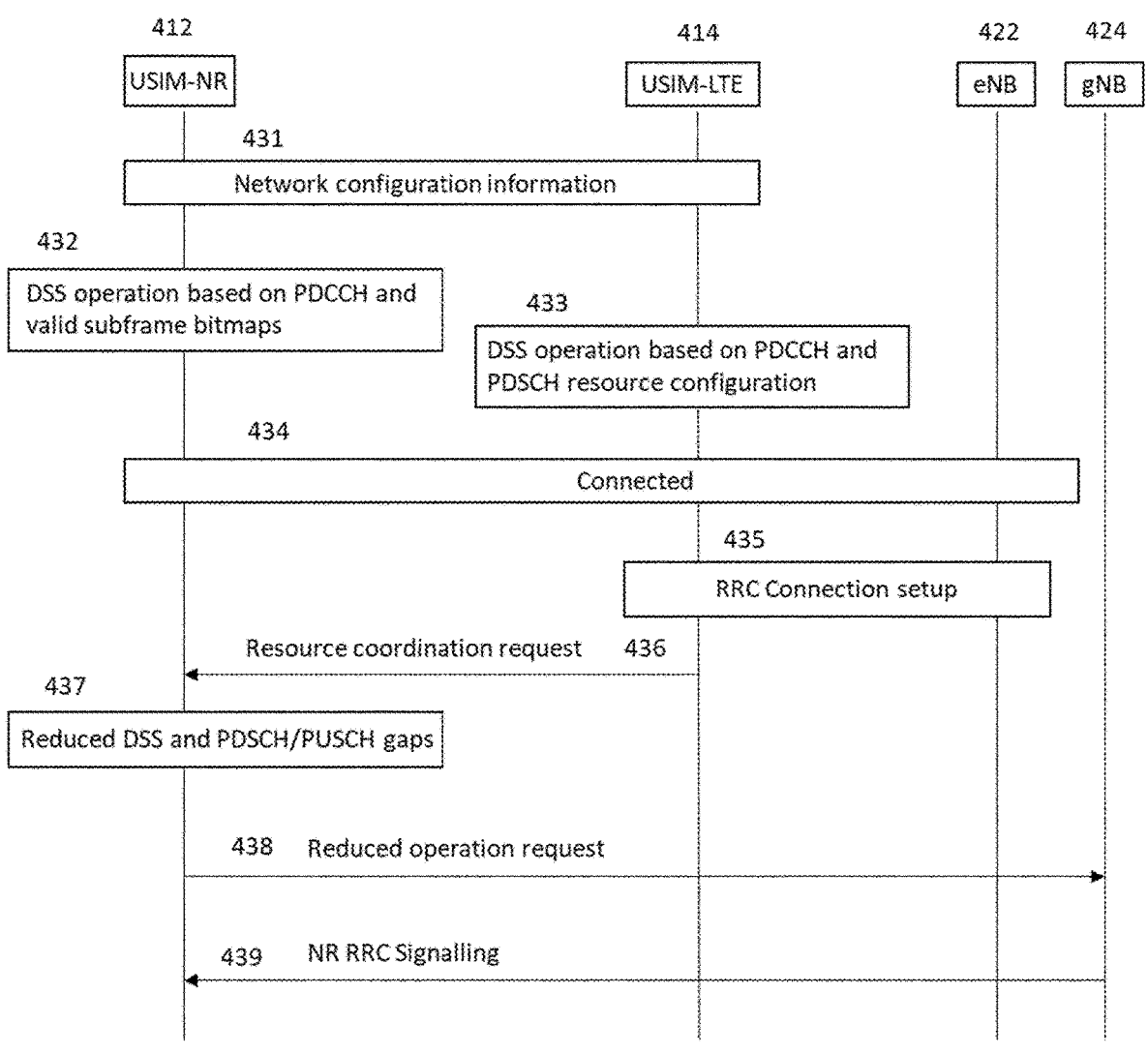

FIG. 4 illustrates another exemplary embodiment in which a terminal device comprises a network subscription to a 4G network and a network subscription to a 5G network. The terminal device further comprises an USIM for the 4G network subscription and an USIM for the 5G network subscription. In this exemplary embodiment, the status of the terminal device regarding the network subscriptions is in connected state for both network subscriptions. DSS is utilized for the 4G network and the 5G network. In this exemplary embodiment, the terminal device detects that it is connected to two network subscriptions that are for different networks and that DSS is utilized. The terminal device comprises a 5G USIM 412, that may also be referred to as a USIM-NR. The terminal device also comprises a 4G USIM 414, that may also be referred to as a USIM-LTE. In this exemplary embodiment, the connectivity resources of the terminal device used for receiving signalling from the network subscription, in other words, the receiver and the transmitter, are to be shared with the other network subscription. Thus, the terminal device may determine that sharing of the connectivity resources is required. This determination may be achieved for example by signalling internal to the terminal device. This signalling 431 may occur, at least partly, between the 4G USIM 414 and the 5G USIM 412. The signalling 431 comprises exchanging information regarding network configurations corresponding to the network subscriptions respectively.

In 432, DSS operation for 5G network is detected based on PDCCH configurations and valid subframe bitmap. This may be performed by the 5G USIM 412. In 433 on the other hand, DSS operations are determined for the 4G network based on PDCCH and PDSCH resource configuration. This may be performed by the 4G USIM 414. Then in 434 a connection may be established to a gNB 424 and operation in a connected mode may begin. A 4G connection may also be established by RRC connection setup procedure signalling 435 between the terminal device and then eNB 422. The signalling may be performed by the 4G USIM 414 comprised in the terminal device. Internal signalling 436 within the terminal device may then be utilized. A resource coordination request may be signalled indicating that a switching gap is required. The signalling may be between the 4G USIM 414 and 5G USIM 412. Then it may be determined in 437 that reduced search space operation is required and, possible also, PDSCH/PUSCH switching gaps. The determination may be performed by the 5G USIM 412. Thus, RRC signalling 438 may be transmitted by the terminal device to the gNB indicating the request for reduced operation. Additionally, details regarding requested switching gap such as subframe and/or symbol pattern may also be indicated in the RRC signalling 438. The RRC signalling 438 may take place between the 5G USIM 412 and the gNB 424. After that, the gNB 424 may transmit RRC signalling 439 to the terminal device in which it configures the terminal device for reduced search operation and may additionally indicate a pattern for the switching gap. The RRC signalling 439 may take place between the gNB 414 and the 5G USIM 412.

If the 4G and 5G resources are adjacent, the switching gaps may enable the terminal device to have enough time for changing the base band operation from 4G to 5G and vice versa. Without such switching gaps known to network there could be some degradation in the PUSCH/PDSCH operation on these adjacent resources. Thus, in this exemplary embodiment, the terminal device may request for a switching gap to have enough time for the switching. An exemplary embodiment of requesting a switching gap comprises the terminal device informing a need for a switching gap, when DSS is used, as part of capability information of the terminal device to gNB.

If the terminal device then detects a connection being established to 4G network, the terminal device transmits an indication to the gNB that a switching gap is needed for NR CORESET monitoring. The gNB then confirms the reduced PDCCH transmission via RRC signaling message. Further, PDSCH co-ordination in DSS may also be needed. In such a situation, the gNB may indicate alternating PDCCH occasions where the terminal device may receive complete PDSCH from the gNB. For the PDSCH transmission on remaining occasions the terminal device may skip initial symbols for NR-PDSCH reception. The terminal device may also indicate alternating PDCCH occasion to an eNB where it can schedule complete PDSCH and partial PDSCH to allow switching.

Figure 5:
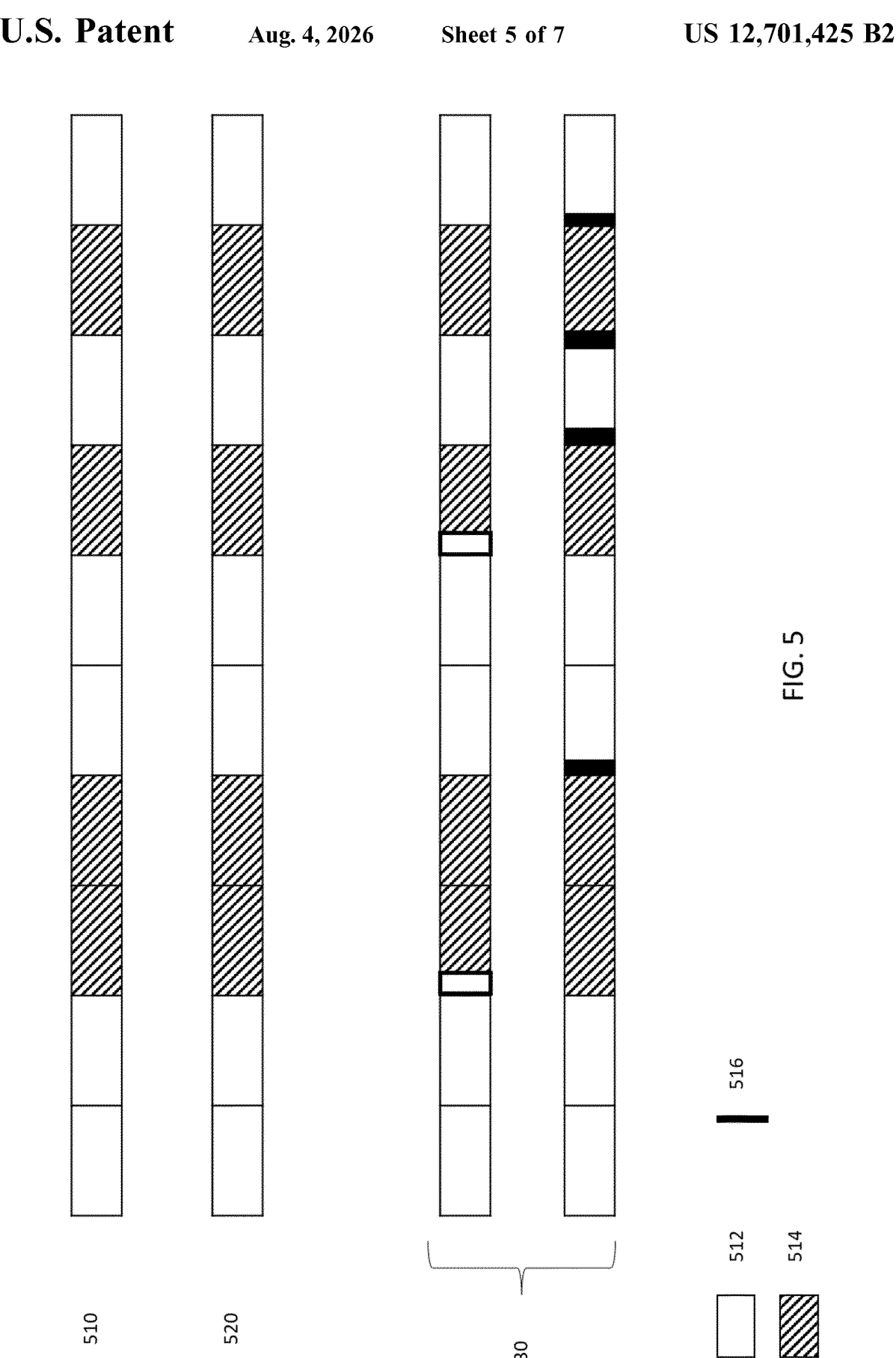
FIG. 5 illustrates an exemplary embodiment of physical downlink shared channel configuration.

FIG. 5 illustrates and exemplary embodiment of a 5G PDSCH configuration for a situation in which the terminal device has active 5G and 4G network subscriptions and both are in active mode of operation. DSS is also utilized. 5G resource location for DSS is illustrated by 510 and 4G resource location for DSS is illustrated by 520. An alternative configuration that comprises switching gaps for 5G PDSCH is illustrated in 530. 4G subframes are illustrated as 512 and 5G subframes as 514. In this exemplary embodiment, gNB configures the switching gaps 516 for valid 5G subframes 514 before and after the 5G subframe 514. After that, the terminal device informs this gap to the eNB so that eNB may then configure its switching gap to avoid any impact for 5G and 4G PDSCH reception. In this exemplary embodiment, the DSS operation on same carrier is configured as a TDM operation with 4G operation restricted to subframes 0, 1, 4, 5, 7 and 9. When the 4G network subscription associated with the terminal device enters into connected mode, the 5G RRC signalling message will request for a switching gap at start of subframes in subframes 2, 6 and 8. The gNB may configure the switching gap for PDSCH for subframes 2 and 6. In this exemplary embodiment, the pattern periodicity is 10 subframes. Number of symbols for gap is 1 symbol in this exemplary embodiment. With this configuration, when the subframe 8 is not configured with a switching gap by the gNB, the terminal device will need to negotiate or skip receiving 4G PDSCH in first few symbols in which gNB did not configure the gaps.

Figure 6:
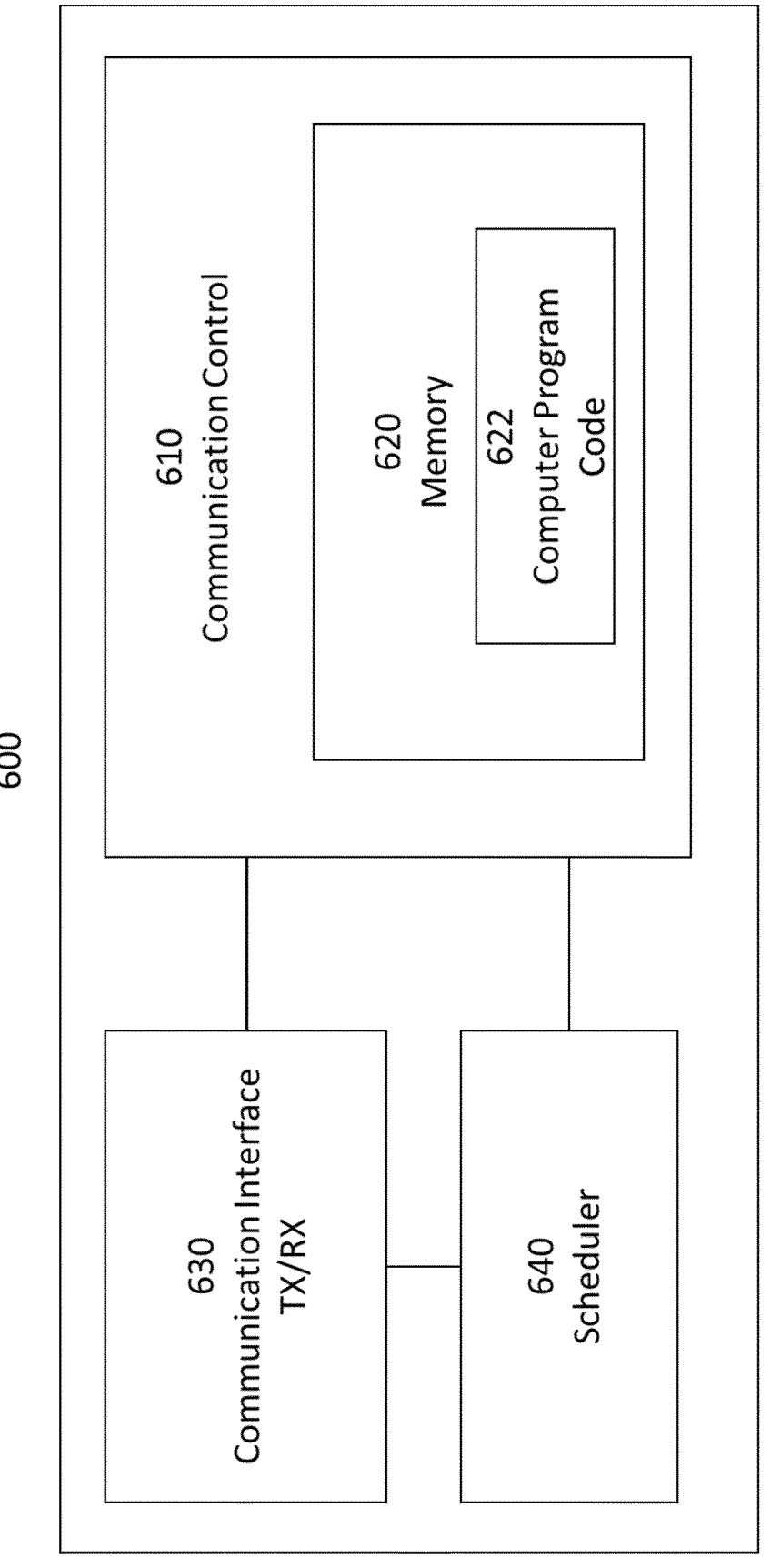
FIG. 6 and FIG. 7 illustrate exemplary embodiments of an apparatus.

The apparatus 600 of FIG. 6 illustrates an example embodiment of an apparatus that may be an access node or be comprised in an access node. The apparatus may be, for example, a circuitry or a chipset applicable to an access node to realize the described embodiments. The apparatus 600 may be an electronic device comprising one or more electronic circuitries. The apparatus 600 may comprise a communication control circuitry 610 such as at least one processor, and at least one memory 620 including a computer program code (software) 622 wherein the at least one memory and the computer program code (software) 622 are configured, with the at least one processor, to cause the apparatus 600 to carry out any one of the example embodiments of the access node described above.

The memory 620 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 600 may further comprise a communication interface 630 comprising hardware and/or software for realizing communication connectivity according to one or more communication protocols. The communication interface 630 may provide the apparatus with radio communication capabilities to communicate in the cellular communication system. The communication interface may, for example, provide a radio interface to terminal devices. The apparatus 600 may further comprise another interface towards a core network such as the network coordinator apparatus and/or to the access nodes of the cellular communication system. The apparatus 600 may further comprise a scheduler 640 that is configured to allocate resources.

Figure 7:
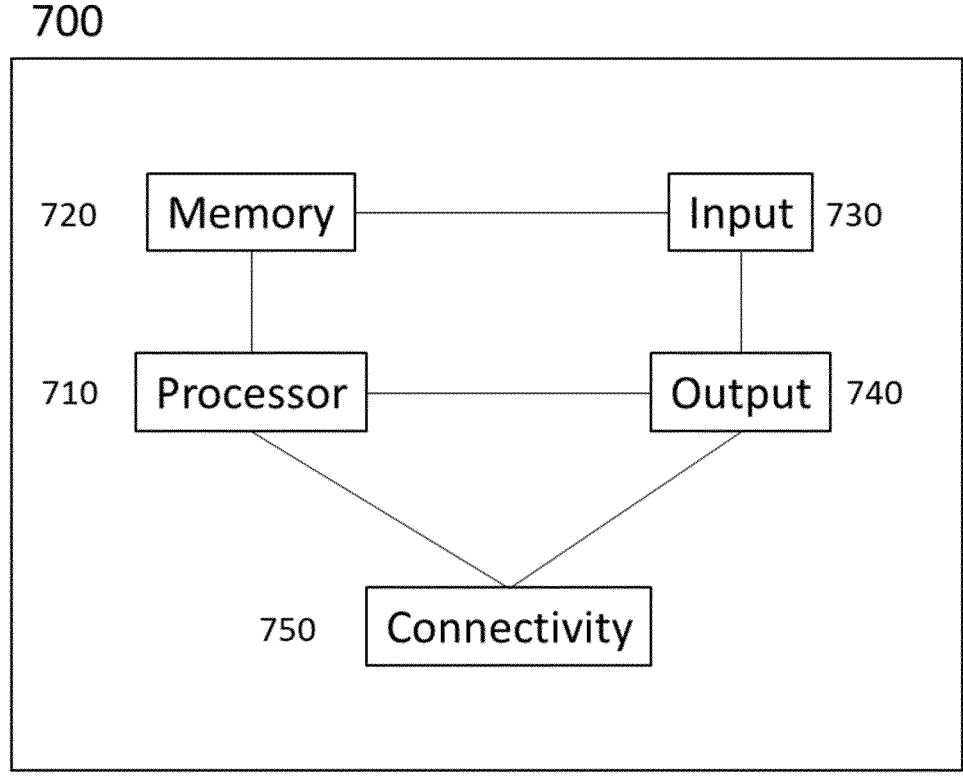

FIG. 7 illustrates an apparatus 700, which may be an apparatus such as, or comprised in, a terminal device, according to an example embodiment. The apparatus 700 comprises a processor 710. The processor 710 interprets computer program instructions and processes data. The processor 710 may comprise one or more programmable processors. The processor 710 may comprise programmable hardware with embedded firmware and may, alternatively or additionally, comprise one or more application specific integrated circuits, ASICs.

The processor 710 is coupled to a memory 720. The processor is configured to read and write data to and from the memory 720. The memory 720 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 720 stores computer readable instructions that are execute by the processor 710. For example, non-volatile memory stores the computer readable instructions and the processor 710 executes the instructions using volatile memory for temporary storage of data and/or instructions.

The computer readable instructions may have been pre-stored to the memory 720 or, alternatively or additionally, they may be received, by the apparatus, via electromagnetic carrier signal and/or may be copied from a physical entity such as computer program product. Execution of the computer readable instructions causes the apparatus 700 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 700 further comprises, or is connected to, an input unit 730. The input unit 730 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 730 may comprise an interface to which external devices may connect to.

The apparatus 700 also comprises an output unit 740. The output unit comprises or is connected to one or more displays capable of rendering visual content such as a light emitting diode, LED, display, or a liquid crystal display, LCD. The output unit 740 may further comprise a transmission unit, such as one or more waveguides or one or more lenses, to transfer the rendered visual content to the user's field of view. The output unit 740 further comprises one or more audio outputs. The one or more audio outputs may be for example loudspeakers or a set of headphones.

The apparatus 700 may further comprise a connectivity unit 750, which may be a connectivity hardware unit comprising at least one transmitter and/or one receiver. The connectivity unit 750 enables wired and/or wireless connectivity to external networks. The connectivity unit 750 may comprise one or more antennas and one or more receivers that may be integrated to the apparatus 700 or the apparatus 700 may be connected to. The connectivity unit 750 may comprise an integrated circuit or a set of integrated circuits that provide the wireless communication capability for the apparatus 700. Alternatively, the wireless connectivity may be a hardwired application specific integrated circuit, ASIC.

It is to be noted that the apparatus 700 may further comprise various component not illustrated in the FIG. 7. The various components may be hardware component and/or software components.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. An apparatus comprising at least one processor, and at least one memory including a computer program code, wherein the at least one memory and the computer program code are configured, with the at least one processor, to cause the apparatus to:

detect that a first network subscription and a second network subscription are associated with a terminal device, wherein the first network subscription is to a first radio access technology type and the second network subscription is to a second radio access technology type, and dynamic spectrum sharing is utilized for the first network type and the second network type;

determine that the first network subscription and the second network subscription utilize, at least partly, same connectivity resources comprised in the terminal device;

identify that a first reception activity regarding the first network subscription occurs, at least partly, simultaneously with a second reception activity regarding the second network subscription; and based, at least partly, on the identifying, transmit a first indication indicating a need for reduced search space operation to an access node, wherein in the reduced search space operation the terminal device monitors orthogonal frequency-division multiplexing symbols of control resource set for paging monitoring in a limited manner.

2. An apparatus according to claim 1, wherein the apparatus is further caused to receive from the access node radio resource signalling that configures the terminal device for the reduced search space operation.

3. An apparatus according to claim 1, wherein the apparatus is further caused to determine a need for a switching gap and the need for the switching gap is indicated using a second indication to the access node.

4. An apparatus according to claim 1, wherein detecting that dynamic spectrum sharing is utilized is based on internal signalling within the terminal device, and wherein the internal signalling comprises exchanging information regarding network configurations of the first and the second network configurations respectively.

5. An apparatus according to claim 1, wherein the first radio access technology type is 5G associated with the access node and the second radio access technology type is a 4G associated with a second access node, and wherein the access node is a gNB and the second access node is an eNB.

6. An apparatus according to claim 1, wherein the apparatus is further caused to transmit a third indication to the access node, the third indication indicating a restriction on bandwidth part operation that limits a bandwidth part to a bandwidth and a subcarrier spacing associated with the network supporting the least bandwidth part.

7. A method comprising:

detecting that a first network subscription and a second network subscription are associated with a terminal device, wherein the first network subscription is to a first radio access technology type and the second network subscription is to a second radio access technology type, and dynamic spectrum sharing is utilized for the first network type and the second network type;

determining that the first network subscription and the second network subscription utilize, at least partly, same connectivity resources comprised in the terminal device;

identifying that a first reception activity regarding the first network subscription occurs, at least partly, simultaneously with a second reception activity regarding the second network subscription; and based, at least partly, on the identifying, transmitting a first indication indicating a need for reduced search space operation to an access node, wherein in the reduced search space operation the terminal device monitors orthogonal frequency-division multiplexing symbols of control resource set for paging monitoring in a limited manner.

* * * * *